(12) United States Patent
Greenlee et al.

(10) Patent No.: US 8,378,787 B2
(45) Date of Patent: Feb. 19, 2013

(54) METHOD AND APPARATUS FOR DISABLING A DATA TAG DEVICE

(75) Inventors: Kenneth L. Greenlee, Raleigh, NC (US); Christian L. Hunt, Cary, NC (US); Steven M. Miller, Cary, NC (US); Anne I. Ryan, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1293 days.

(21) Appl. No.: 12/134,522

(22) Filed: Jun. 6, 2008

(65) Prior Publication Data
US 2009/0303017 A1  Dec. 10, 2009

(51) Int. Cl.
*H04Q 5/22* (2006.01)

(52) U.S. Cl. ............. 340/10.1; 340/572.1; 340/572.3; 340/10.34; 340/10.5

(58) Field of Classification Search ............ 340/10.1
See application file for complete search history.

(56) References Cited

U.S. PATENT DOCUMENTS

| | | | |
|---|---|---|---|
| 5,573,611 A | 11/1996 | Koch et al. | |
| 6,025,780 A | 2/2000 | Bowers et al. | |
| 6,741,523 B1 | 5/2004 | Bommarito et al. | |
| 7,161,476 B2 | 1/2007 | Hardman et al. | |
| 7,212,955 B2 | 5/2007 | Kirshenbaum et al. | |
| 7,321,307 B1 | 1/2008 | Tow et al. | |
| 7,345,586 B2 | 3/2008 | Black et al. | |
| 7,375,635 B2 * | 5/2008 | Kessler | 340/572.1 |
| 7,411,503 B2 * | 8/2008 | Stewart et al. | 340/572.1 |
| 7,548,164 B2 | 6/2009 | Guez et al. | |
| 7,667,572 B2 * | 2/2010 | Husak et al. | 340/10.1 |
| 7,855,644 B2 * | 12/2010 | Greenlee et al. | 340/572.1 |
| 2005/0116826 A1 * | 6/2005 | Wertsebrger | 340/572.3 |
| 2005/0127157 A1 * | 6/2005 | Stemmle et al. | 235/377 |
| 2006/0121851 A1 * | 6/2006 | Moore et al. | 455/41.2 |
| 2006/0187046 A1 | 8/2006 | Kramer | |
| 2007/0018832 A1 * | 1/2007 | Beigel et al. | 340/572.7 |
| 2008/0084309 A1 | 4/2008 | Posamentier | |
| 2008/0117050 A1 | 5/2008 | Wu et al. | |
| 2008/0157974 A1 | 7/2008 | Boss et al. | |
| 2009/0040878 A1 | 2/2009 | Domes et al. | |
| 2009/0212781 A1 * | 8/2009 | Bertness et al. | 324/426 |
| 2009/0276790 A1 | 11/2009 | Greenlee et al. | |

(Continued)

OTHER PUBLICATIONS

Karjoth, G., et al., "Disabling RFID Tags with Visual Confirmation: Clipped Tags are Silenced", IBM Research Report, Aug. 2005.

(Continued)

*Primary Examiner* — George Bugg
*Assistant Examiner* — Anthony D Afrifa-Kyei
(74) *Attorney, Agent, or Firm* — Patents on Demand P.A.; Brian K. Buchheit; Scott M. Garrett

(57) ABSTRACT

The present invention discloses a data tag device (100) which initially operates in either an active mode or a semi-active mode (604). The data tag device includes tag circuitry including a interface element (104), a controller element (102), and a memory (106) in which tag data (116) is stored. A battery is provided which is initially coupled to the tag circuitry. A decoupling feature (402) is used to destructively decouple the battery from the tag circuitry when it is desired to disable the data tag device and reduce the ability of third parties to obtain the tag data. The data tag device is configured to detect the destructive decoupling (606, 608), and disable the data tag in response.

18 Claims, 4 Drawing Sheets

U.S. PATENT DOCUMENTS

2009/0303020 A1 12/2009 Greenlee et al.
2009/0303049 A1 12/2009 Greenlee et al.
2009/0303061 A1 12/2009 Greenlee et al.

OTHER PUBLICATIONS

Campbell, A., "Clippable RFID Tags to Protect Consumers", RFID Weblog, Jan. 2006.
Schwartz, E., "IBM Clips RFID's Wings to Stop Private Data's Flight", Computerworld, Nov. 2006.
"Problems With RFID", Technovelgy, LLC, viewed Feb. 5, 2008.
US Pub. No. 20090303061, Notice of Allowance, Aug. 6, 2010.
US Pub. No. 20090303020, Non-Final Office Action, Jun. 9, 2010.
US Pub. No. 20090303049, Non-Final Office Action Jun. 8, 2010.

* cited by examiner

METHOD AND APPARATUS FOR DISABLING A DATA TAG DEVICE

BACKGROUND OF THE INVENTION

The present invention relates to the field of data tag devices, and more particularly to data tag devices which may be operated in an active or semi-active mode and which are used to store time-sensitive data.

Data tag devices are in widespread use and are used to associate information with a particular item, object, or person. A data tag may be passive device which can only respond to queries from tag readers, and which receives power to provide the response from the query signal itself. Alternatively a data tag may be an active device, having its own power source allowing it occasionally broadcast an unsolicited beacon signal. There is also a semi-active mode of operation where the data has a power source to allow it to respond to queries with a stronger signal, allowing a greater distance between a reader and the data tag device. Semi-active data tags otherwise operate as passive data tags, and do not transmit unsolicited beacons.

Tags are used in a variety of industries including retail, transportation, medical/healthcare, and security, to name several. They are configured, accordingly, in a variety of form factors, as dictated by the particular application. Tags can be manufactured at such a low cost that they can be considered disposable in many applications. However, once a given tag's purpose has been fulfilled, it will persist, storing its data in a retrievable format indefinitely. Even active and semi-active tags may remain viable for years after being initially deployed because these tags use very little power.

The persistence of tag data, and the pervasiveness of tag usage have given rise to privacy concerns. Tags are typically concealed in packing materials, containers, products, and even integrated into these items, often without consumer knowledge. When these items are disposed of, the information in the tags may be obtained by third parties. This is particularly true of active tag devices since their beacons signal may be received without any ready query or solicitation. Similarly, semi-active tags can be read from a great distance than a passive tag, so their use is also of particular concern. Information relating to purchases, medicine, identity, even finances could potentially be obtained from tag devices. It is anticipated that tag usage will increase, resulting in an increase of the potential for unintended third parties to acquire tag data.

To ease concerns, some retailers will disable tags on items purchased at the point of sale. However, only those tags which can be disabled, and which are known to be present on a given product can be deactivated. However, deactivating tags at retail points of sale can obviously only affect tags used in retail practices. Disabling these tags adds an additional process at the point of sale, which is typically undesirable since it adds a cost in both equipment and time necessary to deactivate each tag. Furthermore, completely deactivating a tag at a point of sale may be undesirable for other reasons, such as warranty and return tracking, for example.

Another means for deactivating tags is for the consumer to use a so-called RFID zapper, which attempts to overload the circuits of the tag and destroy it as a result. A consumer may also simply destroy a tag to dispose of it. Of course, these methods assume the consumer both knows of the existence of the tag, and that the tag can reasonably be removed from the item with which it is associated.

Therefore there exists a need for a way to disable data tags to reduce the possibility that the tag information will be acquired by third parties.

BRIEF SUMMARY OF THE INVENTION

The invention provides in one embodiment a method of disabling a data tag device. The data tag device having tag circuitry in which tag data is initially stored. The method includes providing a battery on the data tag device which is initially coupled to the tag circuitry, and providing a decoupling feature configured to destructively decouple the battery from the tag circuitry. The method commences by operating the data tag device in an operational mode selected from an active mode and a semi-active mode. While operating the data tag device in the operational mode the method commences by decoupling the battery from the tag circuitry by use of the decoupling feature, and detecting decoupling of the battery from the tag circuitry. In response, the data tag device commences changing tag data stored on the data tag device, and ceasing operation of the data tag device in the operational mode.

The invention, in another embodiment, provides a method of disabling a data tag device, including providing a battery on the data tag device which is initially coupled to the tag circuitry. Additionally, the method includes providing a decoupling feature configured to destructively decoupling the battery from the tag circuitry. Once so provisioned the method commences by operating the data tag device in an operational mode selected from an active mode and a semi-active mode, wherein the battery provides power for operating the data tag device in the operational mode. While operating the data tag device in the operational mode, the method commences by decoupling the battery from the tag circuitry by use of the decoupling feature, and detecting the decoupling of the battery from the tag circuitry. In response to detecting the decoupling of the battery from the tag circuitry, the data tag device ceases operation of the data tag device.

In a further embodiment of the invention is a data tag device which has tag circuitry disposed on a main portion of the data tag device which includes an interface element, a control element, and a memory element having tag data stored therein. The data tag device further includes an antenna element coupled to the interface element and a battery coupled to the tag circuitry which provides a voltage to the tag circuitry while coupled to the tag circuitry. The data tag device further includes a decoupling feature configured to facilitate destructive decoupling of the battery from the tag circuitry by a user. The control element is configured to detect decoupling of the battery from the tag circuitry and erase the tag data in response.

In a further embodiment of the invention, the invention is implemented in a computer program product. Machine readable code stored on the computer program product will cause a data tag device to operate the data tag device in an active mode. While in the active mode, the data tag device occasionally transmits a beacon and provides access to tag data. The code will cause the tag to detect the occurrence of an expiration event while operating the data tag device in the active mode, and disable the power source upon detecting the expiration. Once the power source is disabled, the data tag device is prevented from subsequent active mode operation.

DETAILED DESCRIPTION OF THE INVENTION

Figure 1:
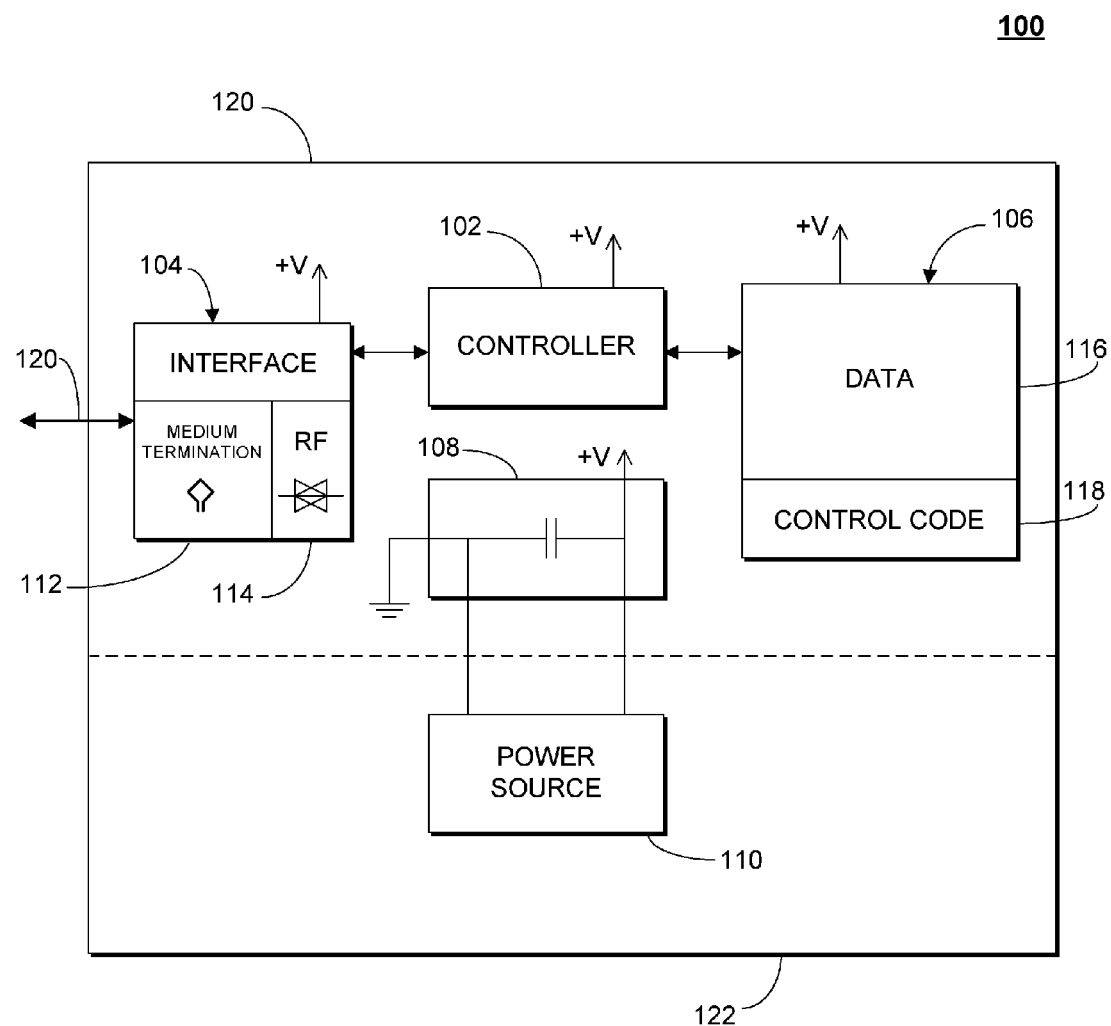
FIG. 1 is a block schematic diagram of an active data tag device in accordance with an embodiment of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented at least in part in software, which includes but is not limited to firmware, resident software, microcode, etc.

Furthermore, the invention may be embodied as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The invention addresses the problem of data persistence in data tag devices by providing a means to disable the data tag to reduce the risk of tag data being acquired by unintended parties. According to the invention, a data tag operates in an active or semi-active mode until a battery connection to the tag circuitry is disabled by a destructive means under control of a user.

FIG. 1 is a block schematic diagram of a data tag device 100 in accordance with an embodiment of the invention. The data tag device is used to store data, and physically associate that data with some object. The tag is typically made to be disposable, and may be permanently or semi-permanently mounted on the object or object packaging. A tag may be removably attached to an object for a temporary association, as well. The data tag device of the present invention initially has an operation mode that is either an active mode or a semi-active mode. Accordingly, the data tag will require a power source. The data tag device includes tag circuitry including a controller 102, an interface 104, and a memory element 106. Tag circuitry is typically realized on a single integrated circuit chip. Those skilled in the art will appreciate that the grouping of elements shown here, by function, does not necessarily represent how the elements would be grouped physically. The controller 102 is a computing and logic component which executes instructions or programming designed to carry out the functions of the data tag, such as recognizing received queries, generating beacons in the case of active data tags, and fetching data from the memory, for example. Typically, due to the low level of sophistication needed, the controller need not be on the order of a microprocessor, and may instead use dedicated logic which is responsive to a small number of events.

The controller is coupled to an interface element 104 which provides a means of communicating with other devices. The interface element includes a medium termination 112, such as an antenna for wireless communication. Other terminators may be used, such as, for example, an electrical connector, although most tag devices operate wirelessly. A communication circuit 114 is coupled to the termination 112, and converts signals received via the termination to a form usable by the controller 102. Furthermore, the communication circuit receives data signals from the controller and converts them into a form for transmission over the media 120 via the termination 112. In one embodiment of the invention the communication circuit 114 is a radio frequency (RF) transceiver which coverts received radio frequency signals into data signals, and vice-versa, as is known.

The controller is further coupled to a memory element 106, which contains at least a tag data section 116 for storing tag data. The memory element is a machine readable storage medium. The memory element may also contain additional information, such as, for example, control code 118. The control code may include instruction code for operating the controller, as well as operational parameters.

According to the present embodiment the tag circuitry may include a power conditioning or voltage sustaining circuit 108 which is coupled to a power source or battery 110. In one embodiment of the inventive data tag, the tag circuitry is disposed on a main portion 120 while the battery is disposed on a removable portion 122. The removable portion may be removed from the main portion by a destructive act, such as breaking or tearing the removable portion from the main portion. The battery may be coupled to the tag circuitry by a supply line, a ground line, and a sense line may also be used. The ground line establishes a reference potential for the tag circuitry, and the supply line provides an operating potential +V, which may be the raw battery voltage. When the battery is destructively removed from tag device, the controller senses a change in voltage, and undertakes a process in response. The controller may, for example, erase or wipe some or all of the tag data. The sustaining circuit comprises a capacitance to store charge sufficient to provide voltage to the tag circuitry once the battery is disconnected. However, due to use of the charge by the tag circuitry, as well as parasitic parallel resistance, once the battery is disconnected, the electric charge in the capacitance will become depleted, cause the supply voltage +V to drop at a rate substantially faster than the battery voltage would drop during normal operation. A variety of means maybe used to detect the quicker voltage drop of +V once the battery is disconnected, including an analog to digital converter, a comparator circuit with another capacitance in one leg of the comparator circuit, and so on. Alternatively, a sense line may be provided which has no voltage sustaining feature, and upon disconnecting the battery, the sense line voltage will drop very rapidly.

Figure 2:
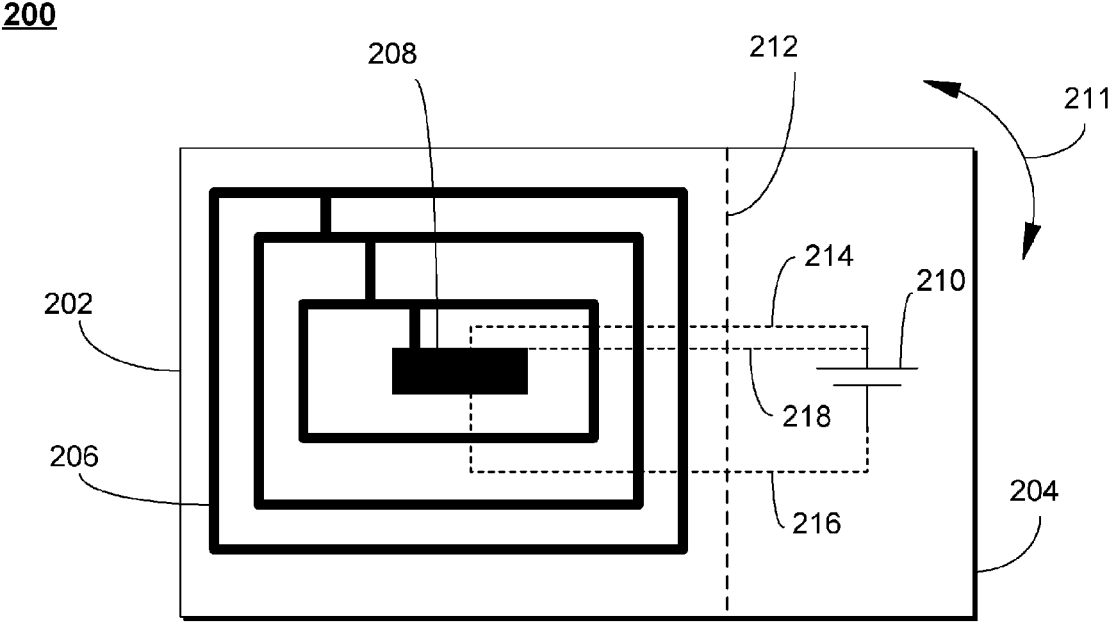
FIG. 2 is a diagram of a data tag device having a removable portion, in accordance with an embodiment of the invention.

FIG. 2 shows a diagram of a data tag device 200 having a removable portion 204, in accordance with an embodiment of the invention. In the present embodiment the tag device includes a rigid substrate that may be broken. The removable portion 204 is a frangible portion which acts as a decoupling feature as it may be destructively broken from a main portion 202. The main portion may include an antenna 206 coupled to a tag chip 208, which includes tag circuitry such as the interface, controller, and memory elements. The frangible portion includes a battery 210, and may be deflected by force from its natural plane, as indicated by 211, to break along a fault feature 212. The fault feature may be a scoring of the substrate, or perforations, for example. Alternatively, the substrate may be necked to narrow the width of the substrate between the removable portion and the main portion. Supply line 214, ground line 216, and sense line 218 may be provided on a layer of the substrate different from the layer on which the antenna is disposed to connect to the tag chip 208. Thus, when a user breaks off the frangible portion, lines 214, 216, and 218 are broken, and the battery is disconnected from the tag circuitry.

Figure 3:
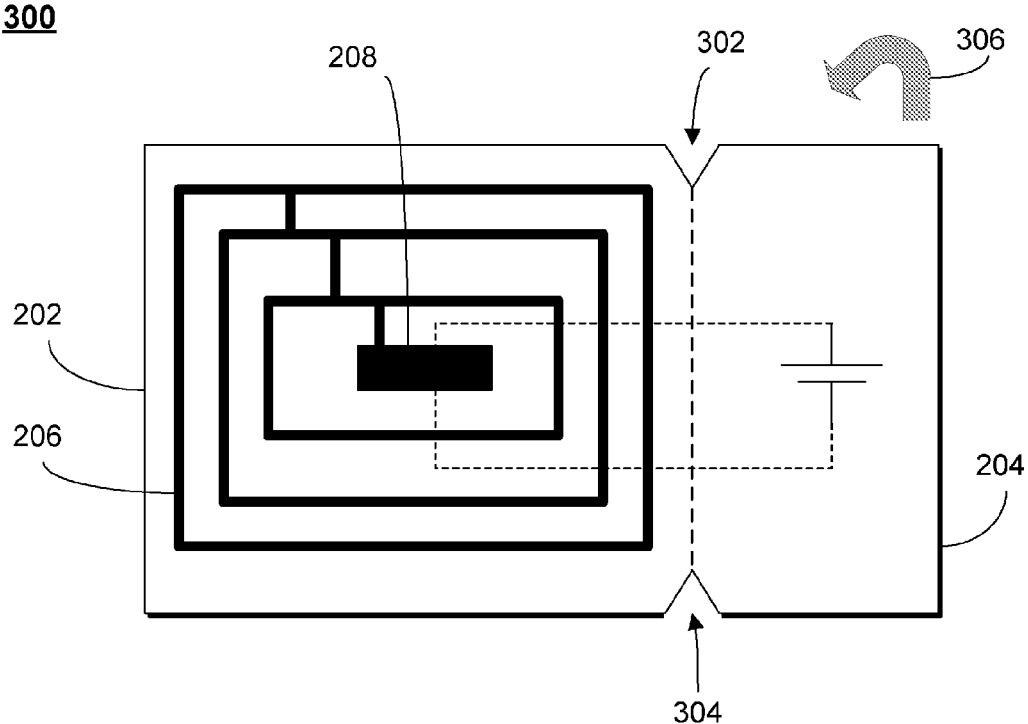
FIG. 3 is a diagram of a data tag device having a removable portion, in accordance with an embodiment of the invention.

FIG. 3 shows a diagram of a data tag device 300 having a removable portion 204, in accordance with an embodiment of the invention. In the present embodiment, the substrate may be a flexible substrate. Accordingly, the removable portion 204 is a tearable portion that acts as a decoupling feature as it may be torn from the main portion 202. To facilitate tearing of the tearable portion from the main portion, features to focus the tearing force on a desired past of the substrate, such as V notches 302, 304 may be provided. When a user pulls the tearable portion over itself, as indicate by arrow 306, the V notch facilities tearing of the substrate, allowing removal of the battery from the tag circuitry.

Figure 4:
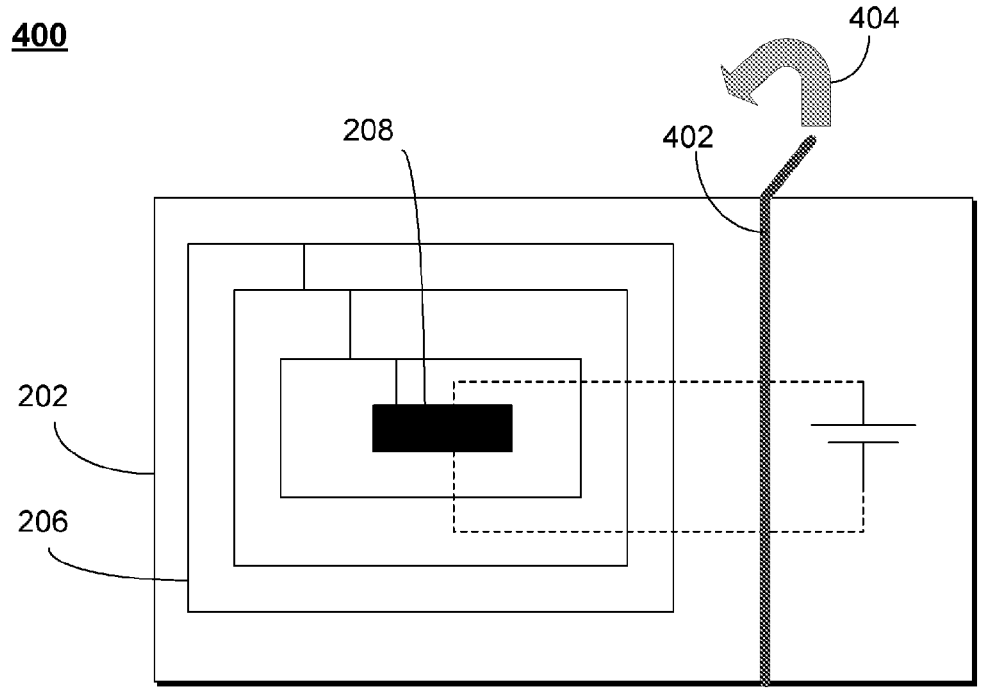
FIG. 4 is a diagram of a data tag device having a tear tab, in accordance with an embodiment of the invention.

FIG. 4 shows a diagram of a data tag device 400 having a decoupling feature in the form of a tear tab 402, in accordance with an embodiment of the invention. The present embodiment does not require the battery to be disposed on a removable portion, and it may allow for the battery to be disposed in close proximity to the tag chip, even within the perimeter of the antenna. The tear tab may be embedded in a layer of the tag substrate such that when it is pulled from the substrate over itself, as indicated by arrow 404, it tears through the higher layers of the substrate, including the layer on which the conductive runners which couple the battery to the tag chip are disposed. The tear tab must therefore be formed of a material strong enough to be pulled through the substrate and break the conductive runners connecting the battery to the tag chip. Alternatively, the tear tab may be formed in the substrate in a manner that allows a portion of the substrate to be lifted, breaking it from the substrate, thereby breaking the conductive runners passing through the lifted portion.

Figure 5:
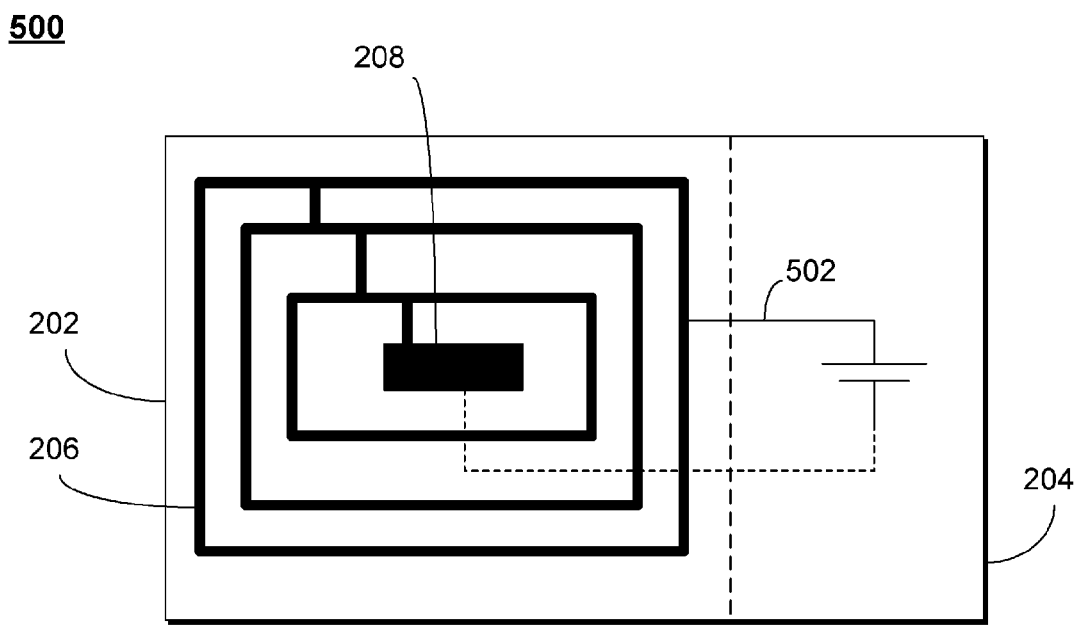
FIG. 5 is a diagram of a data tag device having a removable portion, in accordance with an embodiment of the invention.

FIG. 5 shows a diagram of a data tag device 500 having a removable portion 204, in accordance with an embodiment of the invention. The present embodiment shows how the antenna 206 may be used as part of the sustaining circuit. It is contemplated that the antenna may be designed with an appropriate amount of capacitance which doesn't interfere with antenna operation, or which aids in tuning the antenna for the operating frequency of the antenna. Accordingly, line 502 from the battery is connected to the antenna on the same layer as the antenna, rather than on another layer. The battery voltage +V may be taken from the antenna at the interface, and applied to the tag circuitry.

Figure 6:
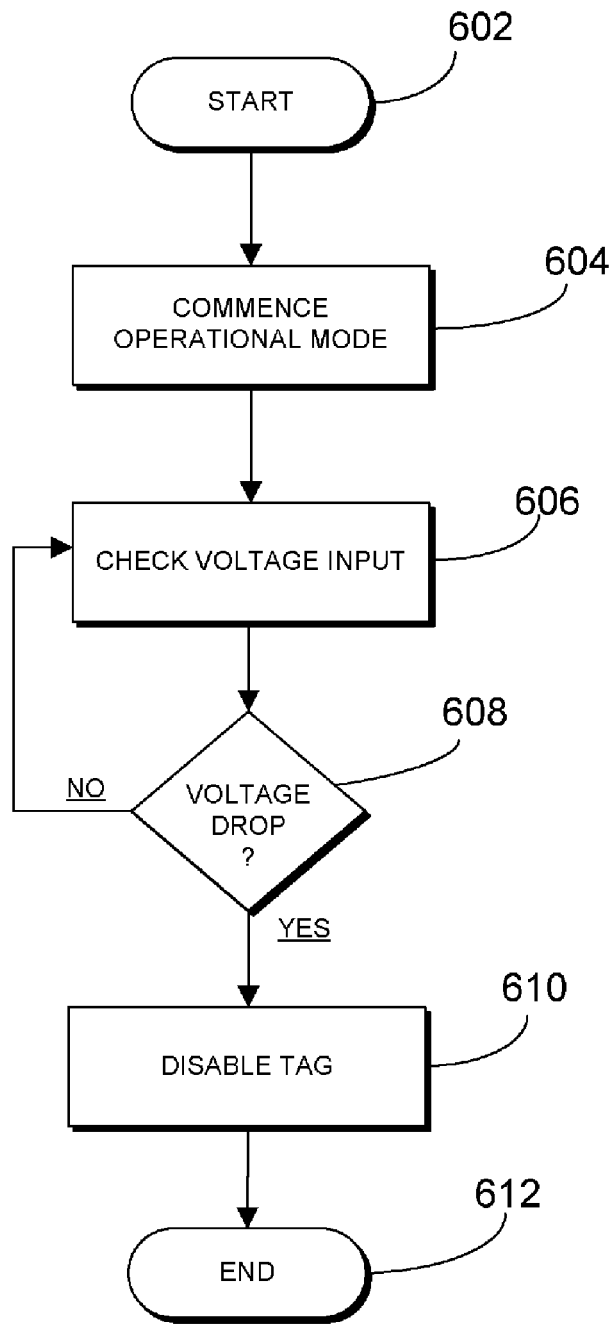
FIG. 6 is a flow chart diagram of a method of disabling a data tag, in accordance with an embodiment of the invention.

FIG. 6 shows a flow chart diagram 600 of a method for disabling a tag device, in accordance with the invention. At the start 602, the tag device has been provided with a battery which is initially coupled to the tag circuitry. Additionally, a decoupling feature is provided which is configured to allow destructive decoupling of the battery from the tag circuitry. The decoupling feature may be, for example, a frangible portion or a tearable portion on which the battery is separately disposed from the tag circuitry, or a tear tab which may be used to break coupling lines between the battery and the tag circuitry. Upon initialization, the tag device commences an operational mode which is either an active mode or a semi-active mode. Whether the operational mode is active or semi-active may be selected by design, or upon initialization. If operating in the active mode the data tag device will use battery power to occasionally transmit beacons. If operating in the semi-active mode, the data tag device will only respond to queries, but will use battery power for responses, as well as receiving queries. Upon becoming operational, the tag device commences a process of detecting the decoupling of the battery from the tag circuitry. The battery is decoupled by a user by use of the decoupling feature, which destructively decouples the battery from the tag circuitry, preventing resumption of operation. To detect the decoupling of the battery from the tag circuitry, the tag device may observe a voltage level for a voltage drop indicative of the battery being decoupled from the tag circuitry (606, 608). Upon detecting the decoupling of the battery from the tag circuitry, the data tag device commences disabling the tag (610). Upon disabling itself, the tag ceases the operational mode. The tag may further disable itself by erasing some or all of the tag data. The tag may operate in a passive mode, where it responds to queries, but requires being powered by the query signal, or the tag may cease operation completely. Upon the tag disabling itself, the method terminates (612).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of disabling a data tag device, the data tag device having tag circuitry and a battery on the data tag device, the battery being initially coupled to the tag circuitry, the data tag device further having a decoupling feature configured to destructively decouple the battery from the tag circuitry, the method comprising:
   operating the data tag device in an operational mode selected from an active mode and a semi-active mode;
   while operating the data tag device in the operational mode, decoupling the battery from the tag circuitry by use of the decoupling feature;
   detecting decoupling of the battery from the tag circuitry;
   changing tag data stored on the data tag device in response to detecting the decoupling of the battery; and
   ceasing operation of the data tag device in the operational mode.

2. A method of disabling a data tag device as defined in claim 1, wherein changing tag data comprises erasing at least a portion of the tag data.

3. A method of disabling a data tag device as defined in claim 1, wherein detecting decoupling of the battery comprises detecting a voltage drop on a battery line of the data tag device.

4. A method of disabling a data tag device as defined in claim 1, wherein ceasing operation of the data tag device comprises ceasing all tag operation.

5. A method of disabling a data tag device as defined in claim 1, wherein ceasing operation of the data tag device comprises operating in a passive mode.

6. A method of disabling a data tag device as defined in claim 1, wherein the decoupling feature comprises providing the battery on a frangible portion of the data tag device, decoupling the battery comprises breaking the frangible portion from a main portion of the data tag device.

7. A method of disabling a data tag device as defined in claim 1, wherein the decoupling feature comprises providing the battery on a tearable portion of the data tag device which can be torn from the data tag device, decoupling the battery comprises tearing the tearable portion from a main portion of the data tag device.

8. A method of disabling a data tag device as defined in claim 1, wherein the decoupling feature comprises providing a tear tab configured to tear through a conductive runner coupling the battery to the tag circuitry, decoupling the battery comprises removing the tear tab in a manner which tears through the conductive runner.

9. A method of disabling a data tag device, the data tag device having tag circuitry and a battery which is initially coupled to the tag circuitry, the data tag device further having a decoupling feature configured to destructively decoupling the battery from the tag circuitry, the method comprising:
   operating the data tag device in an operational mode selected from an active mode and a semi-active mode, wherein the battery provides power for operating the data tag device in the operational mode;

while operating the data tag device in the operational mode, decoupling the battery from the tag circuitry by use of the decoupling feature;

detecting decoupling of the battery from the tag circuitry; and ceasing operation of the data tag device in response to detecting decoupling of the battery.

10. A method of disabling a data tag device as defined in claim 9, further comprising erasing at least a portion of tag data stored in the data tag device in response to detecting decoupling of the battery, performed prior to ceasing operation of the data tag device.

11. A method of disabling a data tag device as defined in claim 9, wherein detecting decoupling of the battery comprises detecting a voltage drop on a battery line of the data tag device.

12. A method of disabling a data tag device as defined in claim 9, wherein the decoupling feature comprises providing the battery on a frangible portion of the data tag device, decoupling the battery comprises breaking the frangible portion from a main portion of the data tag device.

13. A method of disabling a data tag device as defined in claim 9, wherein the decoupling feature comprises providing the battery on a tearable portion of the data tag device which can be torn from the data tag device, decoupling the battery comprises tearing the tearable portion from a main portion of the data tag device.

14. A method of disabling a data tag device as defined in claim 9, wherein the decoupling feature comprises providing a tear tab configured to tear through a conductive runner coupling the battery to the tag circuitry, decoupling the battery comprises removing the tear tab in a manner which tears through the conductive runner.

15. A data tag device, comprising:

tag circuitry disposed on a main portion of the data tag device, and including an interface element, a control element, and a memory element having tag data stored therein;

an antenna element coupled to the interface element;

a battery coupled to the tag circuitry to provide a voltage to the tag circuitry while coupled to the tag circuitry; and a decoupling feature configured to facilitate destructive decoupling of the battery from the tag circuitry by a user;

wherein the control element is configured to detect decoupling of the battery from the tag circuitry and erase the tag data in response.

16. A data tag device as defined in claim 15, wherein the decoupling feature comprises a frangible portion of the data tag device, wherein the battery is disposed on the frangible portion and the destructive decoupling occurs upon the frangible portion being broken from the main portion of the data tag device.

17. A data tag device as defined in claim 15, wherein the decoupling feature comprises a tearable portion of the data tag device, wherein the battery is disposed on the tearable portion and the destructive decoupling occurs upon the tearable portion being torn from the main portion of the data tag device.

18. A data tag device as defined in claim 15, wherein the decoupling feature comprises a tear tab configured to tear through a conductive runner coupling the battery to the tag circuitry, and wherein the destructive decoupling occurs upon removing the tear tab in a manner which tears through the conductive runner.

* * * * *